United States Patent [19]

Schoenfeld

[11] Patent Number: 4,646,570
[45] Date of Patent: Mar. 3, 1987

[54] METHOD AND APPARATUS FOR BALANCING ROTORS

[75] Inventor: Harald Schoenfeld, Darmstadt, Fed. Rep. of Germany

[73] Assignee: Carl Schenck AG, Fed. Rep. of Germany

[21] Appl. No.: 777,404

[22] Filed: Sep. 18, 1985

[30] Foreign Application Priority Data

Sep. 25, 1984 [EP] European Pat. Off. ........ 84111394.7

[51] Int. Cl.[4] .............................................. G01M 1/24
[52] U.S. Cl. ........................................ 73/462; 33/557
[58] Field of Search .................... 73/460, 461, 462, 66, 73/487; 364/508; 33/557, 560

[56] References Cited

U.S. PATENT DOCUMENTS 1,599,609  9/1926  Damerell ............................. 73/487
2,887,902  5/1959  MacMillan ........................... 73/461
3,232,118  2/1966  Hack ................................... 73/462
4,300,197  11/1981 Schönfeld et al. ................... 73/461

FOREIGN PATENT DOCUMENTS 2847643  5/1980  Fed. Rep. of Germany .
3108890  9/1982  Fed. Rep. of Germany .

Primary Examiner—Stewart J. Levy
Assistant Examiner—John E. Chapman, Jr.
Attorney, Agent, or Firm—Connolly and Hutz

[57] ABSTRACT

Method and apparatus for taking into account position inaccuracies of attachment surfaces for later attachment of components, that possess mass on a rotor, such as a crankshaft with crankpins, during balancing of the rotor. The attachment surfaces such as crankpins function as sites for the later assembly of components that possess mass. Differences between the ideal and actual positions of each attachment surface are determined and are taken into account during the balancing procedure.

6 Claims, 3 Drawing Figures

METHOD AND APPARATUS FOR BALANCING ROTORS

BACKGROUND OF THE INVENTION

The present invention relates to the balancing of rotors, and more particularly to rotor balancing which compensates for position inaccuracies.

The invention is concerned with a method for taking into account position inaccuracies of attachment surfaces on rotors, which surfaces facilitate the later attachment of other components which possess mass, with respect to the ideal position of such surfaces on the rotor especially during balancing when only the unoccupied attachment surfaces are present, especially crankpins of crankshafts.

In order to simulate the partial mass of the crank mechanism that is later attached to each individual crankpin, such crank mechanism consisting of connecting rod, piston, piston rings, and wristpin, unbalance compensation masses in the form of bob weights of annular shape are clamped to each crankpin. If in this case there is a deviation in the position of the crankpins from their ideal position on the crankshaft, then the bob weights take this deviation into account. Such deviation may, for example, occur in a V-8 engine in a form that the angular spacing of the individual crankpin axes to each other is no longer 90° but has a different value. The same is true for the radial distance of the crankpin axes from the axis of the crankshaft. These deviations are also taken care of by the bob weights and will no longer have any effect when the total crank mechanism has been assembled.

Attaching and detaching of such bob weights before and after unbalance measurements in the crankshaft is very time consuming. Therefore, balancing machines were equipped with compensating masses (bob weight eliminators) which take into account the influences of the eccentric position of the crankpins on the crankshaft and which are located remote from the crankshaft on the headstock spindle which drives the crankshaft. These compensating masses are arranged at appropriate angular spacing toward each other and at the appropriate radial distance from the axis of the drive spindle in order to eliminate the existing unbalance. Such compensating masses are determined according to nominal dimensions such as the ideal values of angular spacing and radial distance of the individual crankpins. In cases where the crankpins are arranged in symmetry, attachment of bob weights or the use of compensating masses is not necessary since the effect of the ideal values is self compensating based upon the symmetry. If a crankshaft thus compensated rotates, a balance error is necessarily created because of the deviation of the actual from the ideal or "nominal" values of the crankshaft. When the remainder of the crank mechanisms are later connected to the crankshaft, a detrimental effect results. This balance error may exceed the balance tolerance.

The above is true not only for crankshafts but for any rotor with attachment surfaces arranged in prescribed geometric position to the axis of rotation and in prescribed geometric position to each other and arranged on the circumference of a basic body. These surfaces facilitate the later attachment of other components, and as a result of manufacturing tolerances, they often deviate from the geometrically prescribed theoretical position.

SUMMARY OF THE INVENTION

Accordingly, among the objects of the present invention is a rotor balancing apparatus and method which avoids the problems of the prior art by taking into account position inaccuracies of rotor surfaces to which rotor components are later attached, such method and apparatus being easy to follow and use, and highly reliable and dependable.

With the above background as a starting point, the present invention functions to avoid such balance errors without the time expenditure of attaching bob weights and also without the accompanying cost for their maintenance and storage. The difference between the ideal and the actual geometrical position of the crankpins is determined, and the effect of these deviations with respect to their influence on the unbalance of the not yet assembled rotor is separately identified from the existing unbalance of the rotor. The effect of these deviations is eliminated through an addition to the determined unbalances so that for the assembled crankshaft mechanism, balance errors are no longer present.

Balancing crankshafts and other long rotors that incorporate several attachment surfaces for other components to be later attached may be accomplished by combining the balance errors caused by deviations in several attachment surfaces with the actual rotor unbalance.

As a special provision of the subject invention, the same direction of measurement is used for determination of both the deviation, i.e., the geometric measurement, and the unbalance contained in the body. Thus, additional transfer of the unbalance effect caused by the geometric deviation upon unbalance effects in another direction, for instance in a rectangular coordinate system, is avoided.

A measuring system is also provided for carrying out the method invention, so that, without recalculation of nominal values, the precise balance errors due to position inaccuracy are taken into account. The measuring system teaches how the obtained values which would lead to balance errors if measured in a reference system deviating from the reference system in which the unbalance of the rotor is being determined, can be taken into account. The reference system is universally adaptable to reference systems for balancing rotors.

BRIEF DESCRIPTION OF THE DRAWINGS

Novel features and advantages of the present invention in addition to those noted above will become apparent to those skilled in the art from a reading of the following detailed description in conjunction with the accompanying drawings wherein.

DETAILED DESCRIPTION OF THE INVENTION

Figure 1:
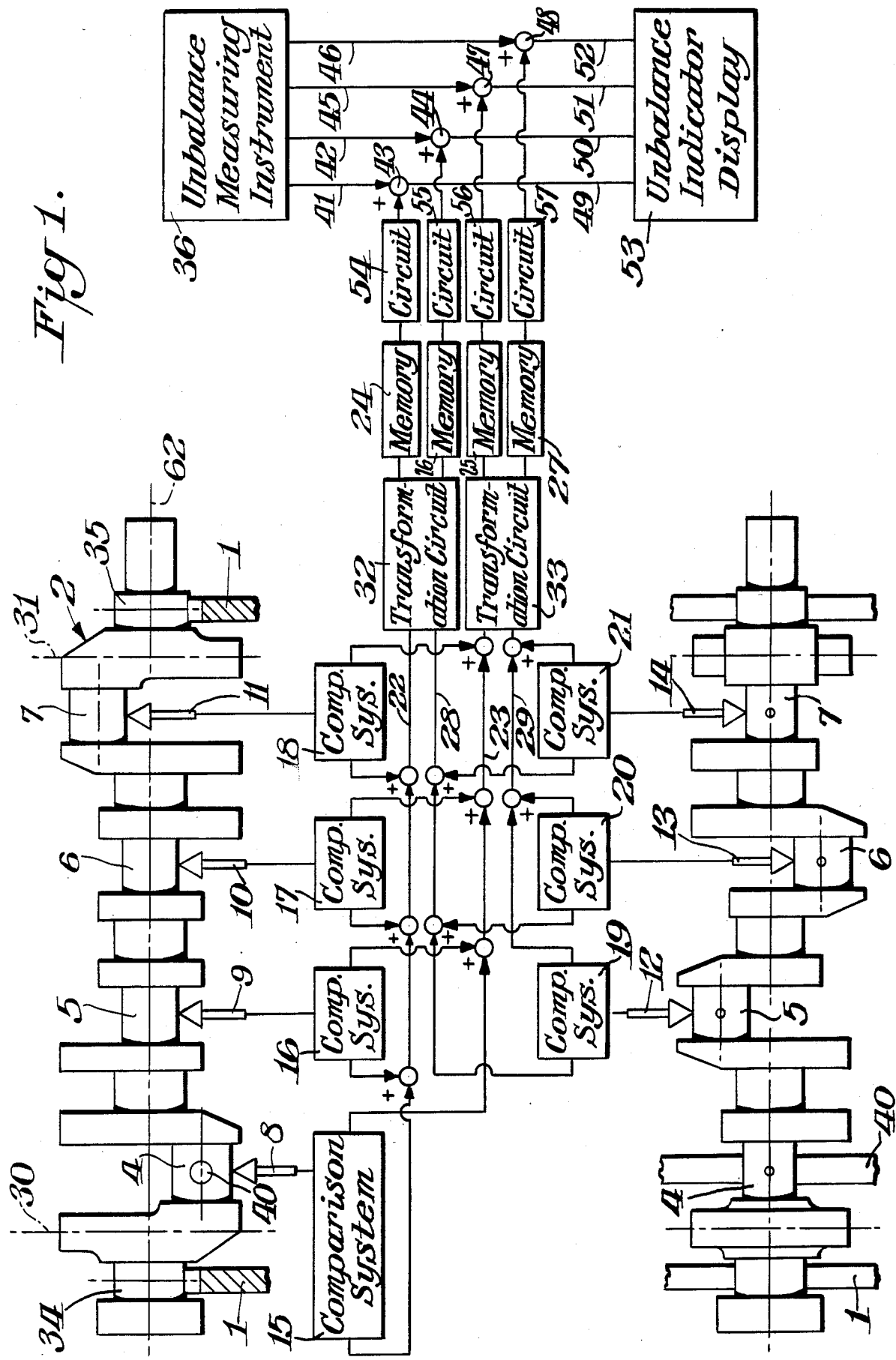
FIG. 1 is a schematic representation in side view and top view of a measuring system for the acquisition and processing of attachment surface deviations in the balancing of rotors.

Referring in more particularity to the drawings, a rotor is supported by measuring supports 1. While the rotor is shown in the form of a crankshaft 2 for a V-8 engine, the method works equally well for other crankshafts of different designs as well as other rotors with attachment surfaces for additional components. Crankshaft 2 is checked regarding crankpins 4,5,6 and 7 with respect to position deviations of the crankpins in radial direction, as well as circumferential directions from each other. The difference between the theoretically correct geometric position and the actual geometric position is sensed by measurement transducers 8,9,10,11, 12,13 and 14 and transmitted to comparison circuits 15 through 21. Any transducer suitable for displacement measurements may be used. Such transducers may be mechanical, optical, or electrical devices, and of the contacting or non-contacting type.

The comparison circuitries 15 through 21 determine the difference between the geometrically correct position and the actual position for each individual pin, this difference being divided between the left correction plane 30 and the right correction plane 31. The differences are added so that the component signal lead 22 carries all vertical difference values for the left correction plane 30 while component signal lead 23 carries all vertical component signals for the right correction plane 31. The signals are led to component memory 24 for the vertical components of the left correction plane 30 and component memory 25 for the vertical components of the correction plane 31. Using additional component signal leads 28,29, the horizontal components for the left correction plane 30 via additional component lead 28 and the horizontal component of the right correction plane 31 via additional component lead 29 are led, separate for each plane, to additional component memories 26,27.

When the geometric measurements are done in measuring support 1 in a reference system that does not correspond to the reference system for unbalance measurements of the rotor, i.e. crankshaft 2, compensations are made for right correction plane 31 and left correction plane 30 by transformation circuits 32,33 where difference values are transformed into the reference system for the measurement of the unbalance of the rotor. Transformation circuits are supplied by leads 22,23 and 28,29.

The measuring support 1 supports the rotor at the same location at which it will be supported later in a balancing machine (not shown). The measuring support 1 could replace the support in the balancing machine for the rotor to be checked, whereby then in the first working step, while the balancing machine is at standstill and, in this case, crankpin 4 (see FIGS. 2 and 3) is clamped in place, the measuring transducers 8 through 14 measure the respective horizontal and vertical positions of the crankpins 4 through 7.

It is of advantage in this case to have the same reference system for the geometric i.e. the static measurements and for the dynamic unbalance measurement. In this case, when the measuring support 1 also represents the support of the balancing machine, transfer errors are eliminated.

Since the difference values are stored according to components in the component memories 24,25 and in further component memories 26,27, the unbalance measurement of the rotor can be made after the transducers 8 through 14 are disconnected and after release of the clamping 40 of crankpin 4. Unbalance vibrations that occur in the bearing planes 34,35 of the balancing machine are recorded, via transducers (not shown). These vibrations are translated by circuitry (not shown) into equivalent values for the right correction plane 31 and the left correction plane 30 and are led to an unbalance-measuring instrument 36 and stored there as components for the left correction plane 30 and the right correction plane 31.

Via the lead 41, certain components may be joined in junction point 43, for example, the vertical components of the unbalance measurement of the rotor with regard to the left correction plane 30 and the vertical components of the difference between nominal and actual values also with respect to the left correction plane 30 out of component memory 24.

At junction point 44 are joined the horizontal components of the unbalance of the rotor with respect to the left correction plane 30 coming via lead 42 and the horizontal components out of component memory 26 of the difference between nominal and actual values also with respect to the left correction plane 30. In the same manner the vertical and horizontal components with respect to the right correction plane 31 which are received via leads 45,46 are joined at junction points 47 and 48 with component differences between nominal and actual values which come from component memories 25,27. The indicator leads 49,50,51,52 now contain, separated as components, the corrected unbalance values from the left correction plane 30 and the right correction plane 31. These values are then displayed on the unbalance indicator 53. It is necessary for this purpose that the components which represent geometric deviations and which are accumulated in the component memories 24 through 27 are represented as unbalance effects in the circuits 54,55,56,57 which are arranged in series with the component memories. These results are then led to the junction points 43,44 and 47, 48 and there added to the components of the unbalance effects which come via the leads 41,42 and 45,46.

Figure 2:
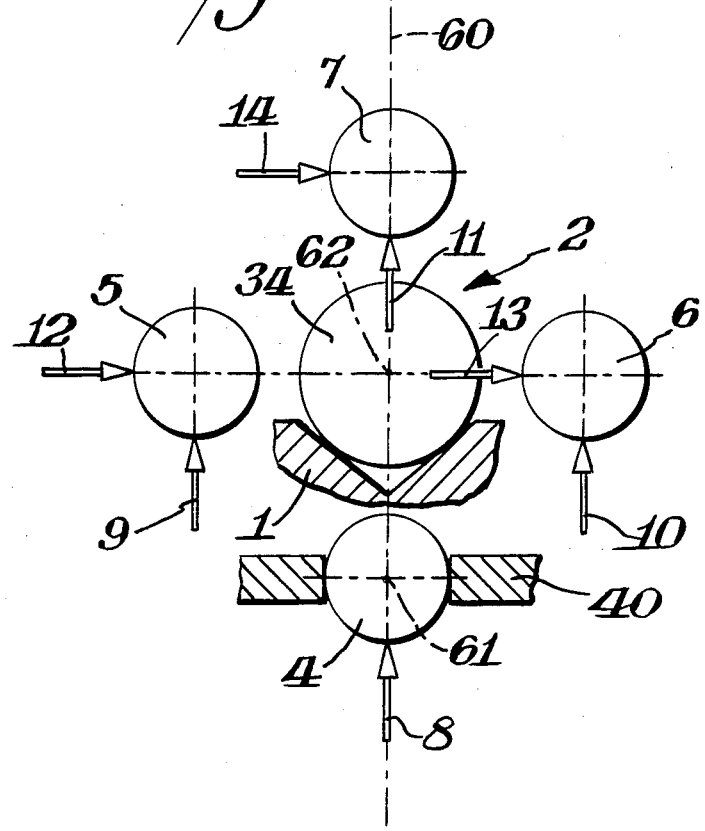
FIG. 2 is a schematic end elevational view of a first reference system for the determination of such deviations.

The reference system for the determination of deviations shown in FIG. 2 shows in simplified form the crankshaft 2 in cross section whereby the crankpin 4 is fixed in the clamp 40. The measuring support 1 supports the crankshaft 2 in the area of the left crank journal and forms bearing plane 34. The axis 61 of the crankpin 4 and the axis of rotation 62 of the crankshaft lie in the vertical plane 60. To determine the radial deviation from the nominal value, the measuring transducers 8 and 11 are attached to the circumference of crankpins 4 and 7 vertical to the axis of rotation of the respective crankpins. A measure for the displacement of the respective axis of rotation of the crankpin, which serves as position for the center of gravity, is thereby obtained. While it is understood that the respective crankpin radii must be considered in this measurement, since crankpins are "diameter exact" components, the individual tolerances of each crankpin need not be taken into account. For other rotors however, for which the attachment surfaces are not sufficiently precise in diameter as is the case in this example, an additional consideration must be given to the distance of the axis of symmetry as position for the center of gravity of the attachment surfaces to its outer contour. The radial deviation of the crankpins 5 and 6 is determined by means of the measurement transducers 12 and 13 horizontally in the direction of the axis of rotation of these crankpins.

The angular displacement of crankpin 5 is determined through transducer 9 arranged vertically in the direction of the axis of rotation of this crankpin. The angular displacement of crankpin 7 is determined through transducer 14 arranged horizontally, and the angular displacement of crankpin 6 is determined through transducer 10, arranged vertically in the direction of the axis of rotation of this crankpin. Since crankpin 4 serves as reference pin in this case, no angular displacement needs to be determined for same.

Figure 3:
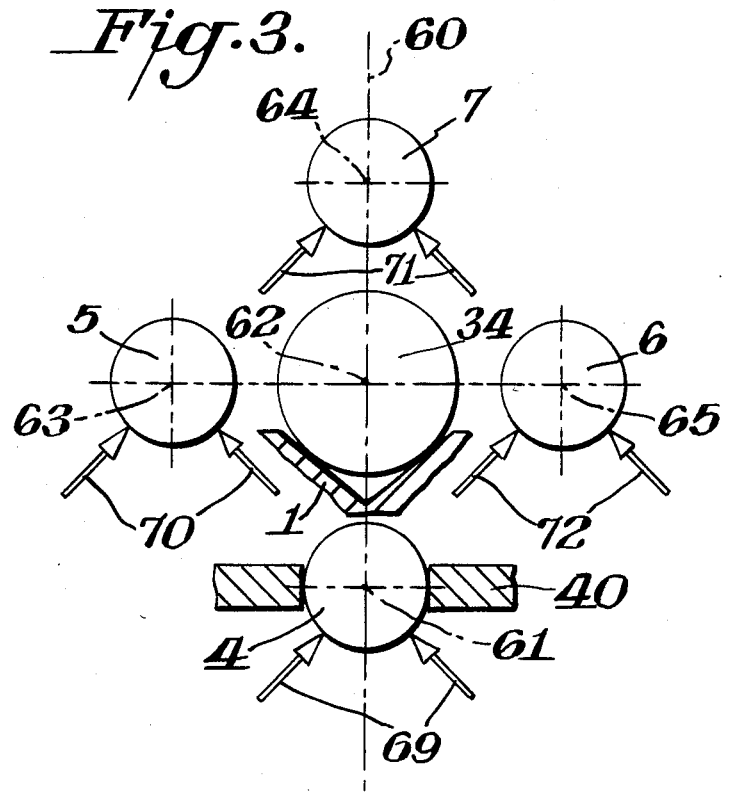
FIG. 3 is a schematic end elevational view of a second reference system for the determination of such deviations.

For the reference system shown in FIG. 3, crankpin 4 is also fixed in the clamping device 40, and the bearing plane 34 is also in measuring support 1. While the axis 61 and the axis of rotation 62 are also in the vertical plane 60, the effective directions of the transducers are in a plane inclined to the vertical plane 60 which respectively crosses the axis 61,63,64 and 65. Because of the arrangement of measurement transducer pairs 69,70,71,72 which cross at their respective axis, the respective offset of the crankpin in radial and in circumferential directions are measured together. In the reference system represented in the example according to FIG. 3, the effective directions of the transducer pairs are positioned at an angle of 90°. However, any other angle between the effective directions of the transducers is also possible. Thereby measurement of the deviation can directly be made in the reference system in which the rotor is being investigated with respect to its unbalance.

What is claimed:

1. In a method of balancing a rotor having attachment surfaces, especially crankpins of a crankshaft, to which components that possess mass are later attached, wherein the effect of attachment of the components are taken into account, the improvement comprising taking into account location inaccuracies of the attachment surfaces, wherein unbalance is determined and the difference between a nominal and actual position of an attachment surface is determined and added as a deviation to the unbalance determined during balancing.

2. The method of claim 1 wherein the effect of the differences between the respective nominal and actual position of several attachment surfaces are added during balancing to correct the determined unbalance.

3. The method of claim 1 wherein the deviation between the nominal and actual position of the attachment surface and the unbalance are determined in the same reference system.

4. Apparatus for taking into account location inaccuracies of attachment surfaces of a rotor for later attachment of components that possess mass on the rotor, with respect to a nominal position of such surfaces, during balancing of the rotor when only equipped with unoccupied attachment surfaces, the apparatus comprising a rotor balancing machine, measuring transducers connected to determine the actual position of the rotor attachment surfaces in radial and circumferential directions, comparison circuitry connected in series to each measuring transducer arranged to compare the difference between the actual position of an attachment surface and the nominal position of such surface in radial and circumferential directions and also to divide the difference into components comprising a left correction plane component and a right correction plane component, data memory means for adding and maintaining the left and right correction plane components of the respective attachment surfaces, conversion circuitry for converting the sums contained in the data memory means into unbalance values for the left and right correction planes of the rotor being balanced, means adding the unbalance values for the left and right correction planes to the results of unbalance measurements of the rotor, and unbalance indicating means connected to indicate the unbalance so modified for each correction plane of the rotor.

5. Apparatus as in claim 4 including a reference system arranged to determine the difference between the actual geometric position of an attachment surface and a nominal value of such surface different from the reference system of the unbalance measurement, and transformation circuitry for converting the determined difference into unbalance values for the left and right correction planes of the rotor being balanced.

6. Apparatus as in claim 5 wherein the reference system includes means for retaining one of the attachment surfaces in fixed position, first and second measuring transducers for determining the position of the attachment surfaces, the first measuring transducers including one transducer for each unfixed attachment surface positioned perpendicular to a plane containing the axis of rotation of the rotor and the longitudinal axis of the fixed attachment surface, each first measuring transducer extending perpendicular to the longitudinal axis of its respective attachment surface, the second measuring transducers including one transducer for each unfixed attachment surface extending perpendicular to the longitudinal axis of its respective attachment surface and angularly disposed relative to the first measuring transducer of an attachment surface.

* * * * *